United States Patent
Thomas et al.

[15] 3,662,260
[45] May 9, 1972

[54] ELECTRIC FIELD MEASURING INSTRUMENT WITH PROBE FOR SENSING THREE ORTHOGONAL COMPONENTS

[72] Inventors: Aubrey M. Thomas; Aubrey G. Holston, both of Panama City, Fla.

[73] Assignee: The United States of America as represented by the Secretary of the Navy

[22] Filed: Feb. 12, 1971

[21] Appl. No.: 114,921

[52] U.S. Cl..................................324/72, 324/1, 324/72.5, 343/709, 343/797, 343/873
[51] Int. Cl........................................................G01r 31/02
[58] Field of Search...............324/1, 72, 72.5; 343/797, 709, 343/873

[56] References Cited

UNITED STATES PATENTS

| | | | |
|---|---|---|---|
| 3,132,342 | 5/1964 | Ford | 343/797 X |
| 3,458,805 | 7/1969 | Kasemir | 324/72 |

*Primary Examiner*—Gerard R. Strecker
*Attorney*—Richard S. Sciascia, Don D. Doty and William T. Skeer

[57] ABSTRACT

An instrument is disclosed which includes a probe for sensing the $x$, $y$, and $z$ orthogonal components of an electric field occurring at any given place in an environmental medium and for producing a trio of analog signals proportional thereto. A computer is connected to said probe for the processing and resolving of said analog signals in such manner as to cause an output signal to be produced thereby that is proportional to the magnitude of the resultant thereof. Further computer structure is optionally employed to make computations and produce signals that are proportional to the vector quantity of the aforesaid resultant with respect to a given reference, as well as the angles thereof relative to the $x$, $y$, and $z$ axes which are coincident with the aforesaid sensed electric field $x$, $y$, and $z$ orthogonal components. Any or all of said signals are read out in terms warranted by any given operational circumstances.

10 Claims, 14 Drawing Figures

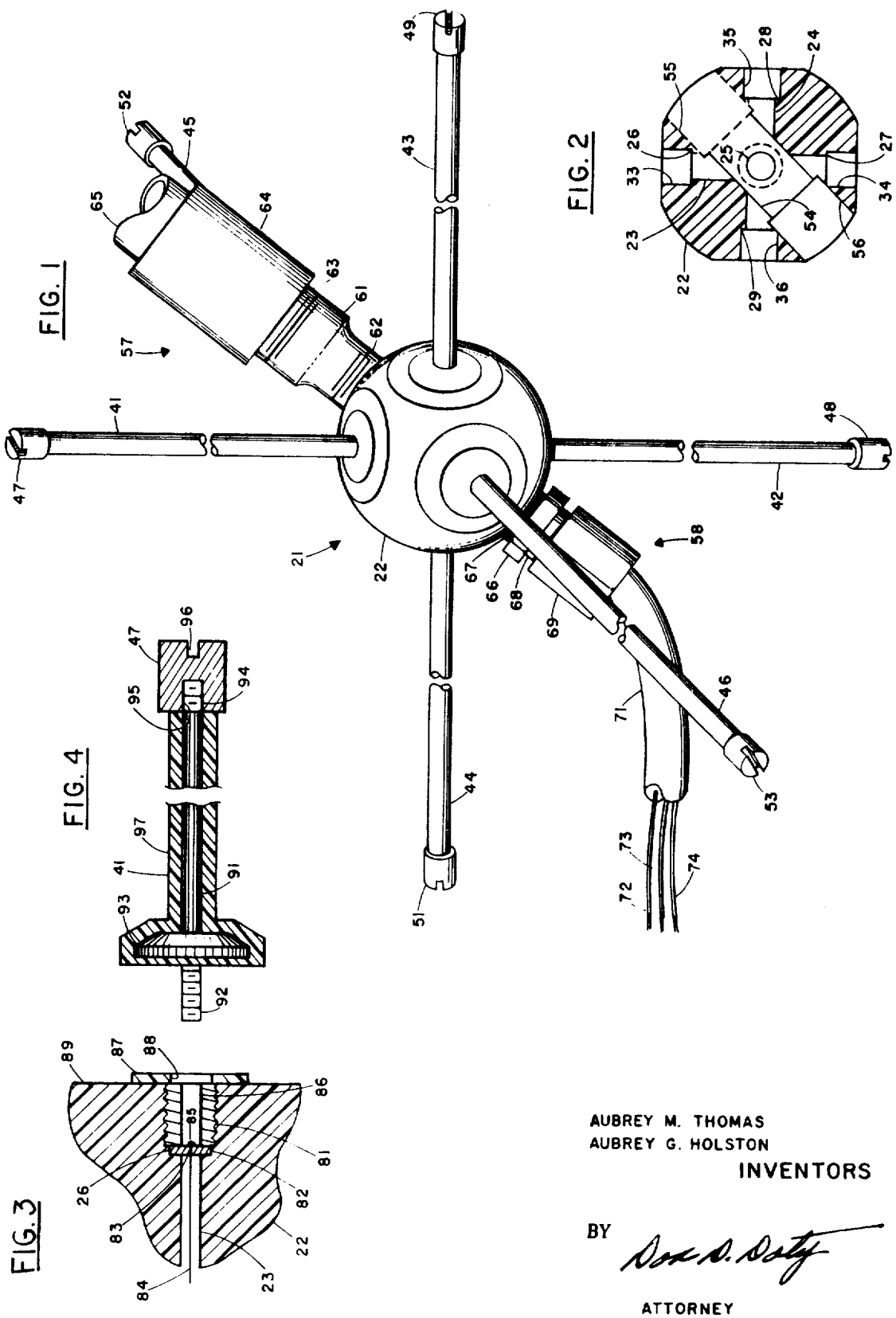
AUBREY M. THOMAS
AUBREY G. HOLSTON
INVENTORS

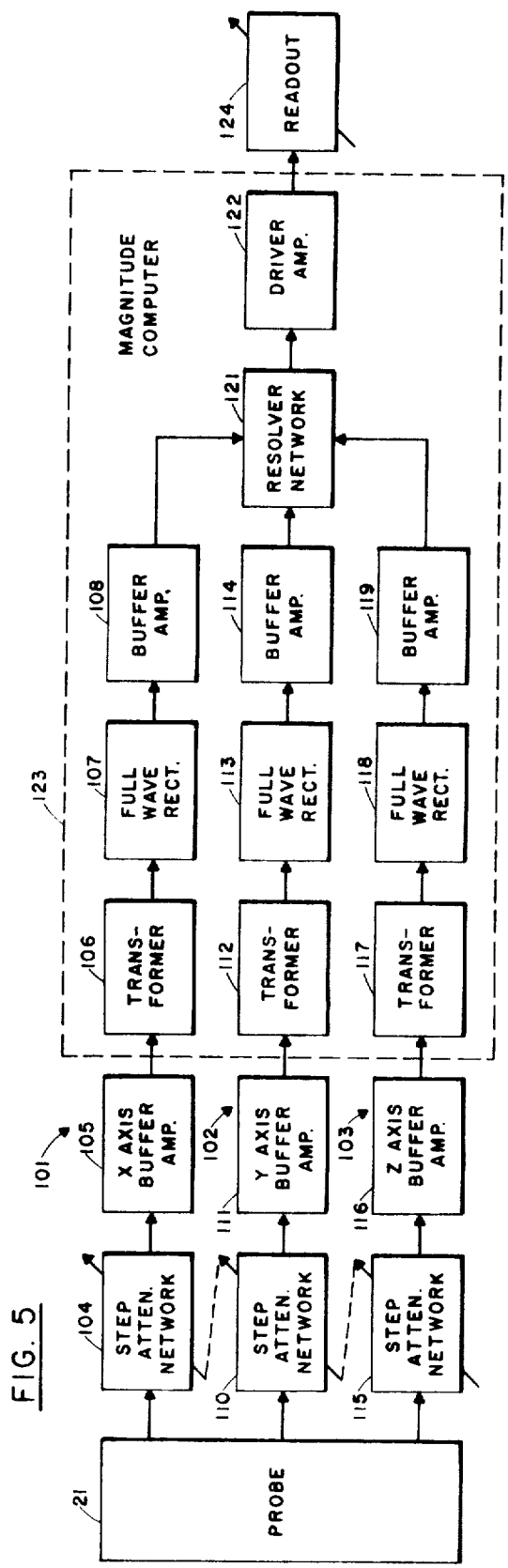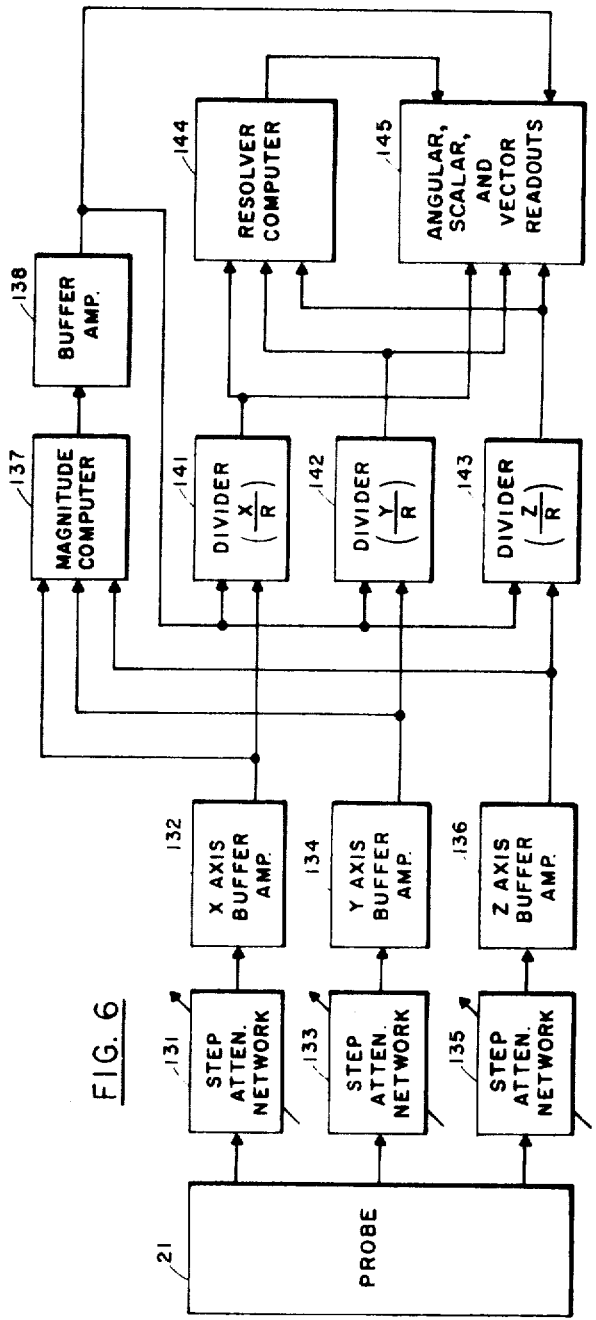

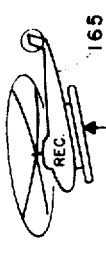
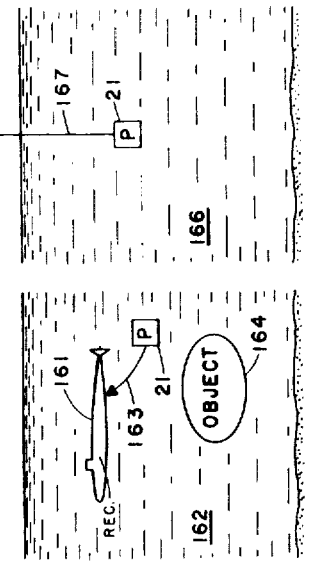
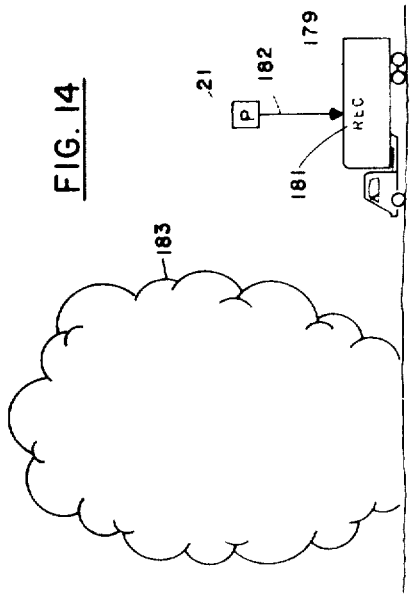
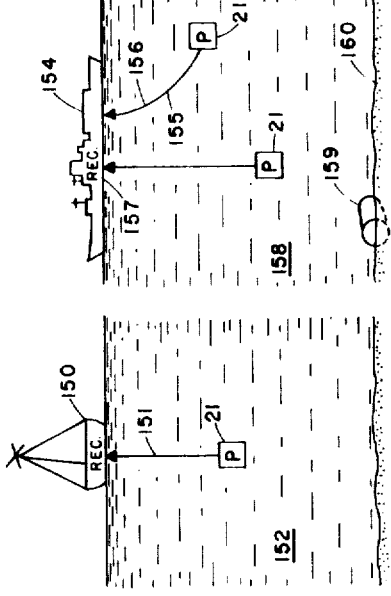
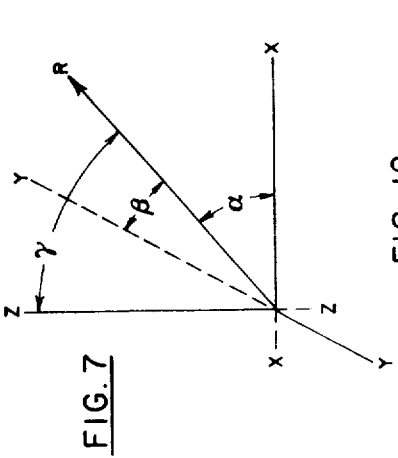
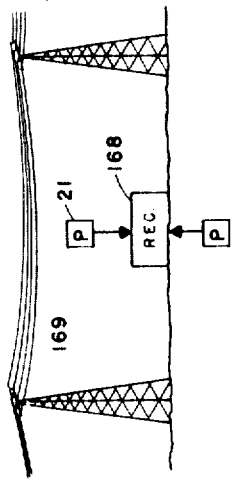
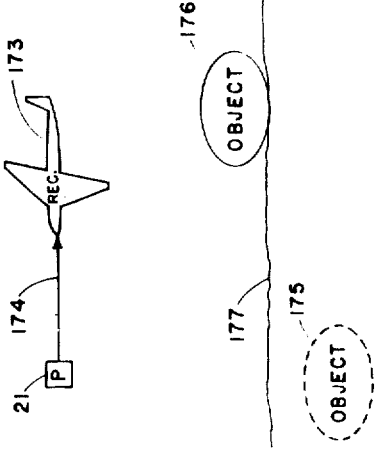
AUBREY M. THOMAS
AUBREY G. HOLSTON
INVENTORS
BY *Don D. Doty*
ATTORNEY

ELECTRIC FIELD MEASURING INSTRUMENT WITH PROBE FOR SENSING THREE ORTHOGONAL COMPONENTS

STATEMENT OF GOVERNMENT INTEREST

The invention described herein may be manufactured and used by or for the Government of the United States of America for governmental purposes without the payment of any royalties thereon or therefor.

FIELD OF THE INVENTION

The present invention relates generally to measuring and testing instrumentation and, in particular, is an instrument for sensing, measuring, and indicating an electric field within any compatible environmental medium. Even more specifically, the subject invention is a method and means for determining and indicating the angular, scalar, and vector quantities of an electric field at any given location within water in general and sea water in particular.

DESCRIPTION OF THE PRIOR ART

Heretofore, electric fields have been sensed and measured in sea water by prior art devices having a pair of electrodes emersed therein which were connected to a voltmeter or oscilloscope for reading the voltage thereacross. This arrangement, of course, only measured the electric field component occurring along the axis existing between said electrodes and, thus, did not measure the total field magnitude, unless the direction of the electrical field just happened to be parallel to said axis. Not only was this method time consuming, it was inaccurate, because the positioning of the electrodes had to be rotated properly in three dimensions until a maximum reading was observed, in order to make a measurement that was significant. While suitable, perhaps, for static momentary laboratory testing, it was not useful for continuously monitoring the total electric field in water or any other environmental medium while being moved therethrough.

SUMMARY OF THE INVENTION

The instant invention comprises a sensitive probe which simultaneously detects the components of an electric field along any three orthogonal axes combined with a receiver which computes the angular dispositions of the field components, the scalar quantities of the field components, the magnitude of the total field, and the resultant vector of the total electric field, either individually or in concert, as warranted by any given operational circumstances. It overcomes many of the disadvantages of the devices of the prior art, in that it is more accurate and sensitive, it will monitor an electric field continuously, it measures the total field as well as the orthogonal components thereof, it may or may not be attitude stabilized and still function for many purposes, and it is considerably more versatile from functional and application standpoints.

It is, therefore, an object of this invention to provide an improved electric field sensing and measuring instrument.

Another object of this invention is to provide an improved method and means for detecting and indicating the orthogonal scalar electric field components, the resultant electric field vector, and the angular dispositions thereof within a total electric field within any appropriate environmental medium, including in water or sea water, in air, in space, in earth, or the like.

Still another object of this invention is to provide a method and means for measuring the peak magnitude of a pulsed electric field in water.

A further object of this invention is to provide an improved method and means for mapping electric fields in any environmental medium in which they exist, including water, sea water, and the like.

Still another object of this invention is to provide an instrument for continuously monitoring ambient electric fields, regardless of their source.

Still another object of this invention is to provide an improved total electric field sensing probe.

A further object of this invention is to provide an electric field sensing means that will sense ambient total peak magnitude of the electric field, regardless of the attitude, orientation, or disposition thereof therein.

Another object of this invention is to provide an improved method and means for measuring pulsed alternating (AC) or direct current (DC) electric fields.

Another object of this invention is to provide an electric field detecting means that is easily and economically manufactured, maintained, and operated.

Other objects and many of the attendant advantages will be readily appreciated as the subject invention becomes better understood by reference to the following detailed description, when considered in conjunction with the accompanying drawings.

BRIEF DESCRIPTION OF THE DRAWING

FIG. 1 is a perspective view of the electric field sensing probe of the invention;

FIG. 2 is a schematic representative cross-sectional view of the spherically shaped center insulator and support housing of the probe of FIG. 1;

FIG. 3 is a cross-sectional view of the rod attachment insert assembly incorporated in the center insulator and support housing of FIG. 1;

FIG. 4 is a cross-sectional view of a voltage gradient rod of the type that is incorporated in the probe of FIG. 1;

FIG. 5 is a block diagram of a preferred embodiment of the electric field measuring instrument constituting the subject invention;

FIG. 6 is a block diagram of another preferred embodiment of the electric field measuring system constituting this invention;

FIG. 7 is a graphical representation of the theory of operation of the invention;

FIGS. 8 through 14 depict a plurality of ways in which the subject invention may be employed to an advantage to sense and measure total electric fields within various and sundry environmental mediums for various and sundry purposes.

DESCRIPTION OF THE PREFERRED EMBODIMENTS

Referring now to FIGS. 1 and 2, there is shown a voltage gradient probe 21 for sensing the three orthogonal components of an electric field. Said probe comprises a housing 22, made of electrically non-conductive materials such as polyvinylchloride or the like, having three orthogonally disposed passageways 23, 24, and 25, the ends of which are enlarged to the extent that shoulders 26 and 27, 28 and 29, and 31 and 32 (not shown) are formed therein, respectively. Within said enlarged ends, internal threads 33 and 34, 35 and 36, and 37 and 38 (not shown) are respectively located.

Into each of the aforesaid end enlargements of passageways 23, 24, and 25 are mounted pairs of insulated metal rod or pipe electrode assemblies 41 and 42, 43 and 44, and 45 and 46, with electrically conductive tips 47 and 48, 49 and 51, and 52 and 53 respectively connected to the ends thereof. The aforesaid rod assemblies and the manner in which they are attached to housing 22 will be described subsequently in conjunction with FIGS. 3 and 4.

Another substantially larger passageway 54 likewise extends through housing 22 preferably in such direction that the axis thereof is located equidistant from the axes of the aforementioned passageways 23, 24, and 25 but intersects each thereof at or near the center of said housing 22. Although such arrangement, as previously indicated, is preferable, any relative arrangement of all passageways may be used that allows actual communication therebetween, so that electrical or other conductors or other components or devices may be inserted therethrough from a common chamber, if so desired.

The opposite ends of passageway 54 are also enlarged and internal pipe threads 55 and 56 are respectively cut therein.

Of course, in actual practice, the size of said enlarged end should be designed to be such as will be compatible with a support pipe assembly 57 and an electrical cable assembly 58 screwed therein, respectively.

In this particular preferred embodiment, support pipe assembly 57 comprises a reducer type of adapter 61 having external pipe threads 62 at one end thereof which fit internal pipe threads 55 of housing 22 for effecting a strong, rigid connection and watertight seal therebetween. At the other end, external threads 63 are also located, so as to be adapted for having a compatibly threaded coupling 64 connected thereto. A pipe, rod, or other type of support member 65 of electrically non-conducting material is likewise connected to coupling 64, preferably by suitable internal and external threads, but by any means warranted by operational circumstances. Pipe 65, of course, is likewise adapted for being mounted on or attached to any appropriate fixed or mobile utilization apparatus, as will be discussed in some detail below.

Electrical cable assembly 58 is preferably composed of a pipe-to-cable nipple 66, with external pipe threads 67 thereof screwed into internal pipe threads 56 of center housing 22, and with external threads 68 thereof screwed into the conventional conduit or cable end fitting 69. An electrical cable 71 having three pairs of insulated wires 72, 73, and 74 included therein is, of course, conventionally connected to end fitting 69, and the three pairs of electrical wires thereof are effectively connected to electrically conductive tips 47 and 48, 49 and 51, and 52 and 53, respectively, by means of rod assemblies 41 through 46, as will be explained more fully subsequently.

At this time, it should perhaps be understood that all mechanical connections and structural materials should be such as to provide waterproofing of all of the structures of probe 21, with the exception of tips 47, 48, 49, 51, 52, and 53, all of which are exposed in electrically conductive configuration to the ambient aqueous medium and the electric field or fields existing therein. Of course, depending on the environment within which probe 21 is deployed, that structural and electrical design therefor should preferably be employed which is best suited for any given operational circumstances and still provide the functional stability and sensitivity required.

In addition, it is perhaps noteworthy that either or both of support pipe and electrical cable assemblies 57 and 58 may be omitted, if desired. For example, the electrical conductors may be run through assembly 57 and pipe 65 to a utilization apparatus located at some remote position, even though pipe 65 is connected thereto for mounting purposes, as well. On the other hand, cable 71 may also be so structured as to act as either a tow or support cable for the entire probe, thereby obviating the necessity of pipe assembly 57. In such event, the electrical wires are also connected to appropriate utilization apparatus, even though, in such case, cable 71 also acts as a support means for probe 21. Moreover, any appropriate electronic instrumentation, transmitter equipment, or other utilization apparatus that will act as indicating, recording, and/or telemetering equipment may be mounted within housing 22 merely by designing each or all thereof for compatible physical and functional association, thereby effectively making probe 21 an unrestricted, freely disposed electric field sensor. Hence, it may, for example, be designed to float with ocean or other water currents if housing 22 is designed to have predetermined buoyancy, so as to cause it to be submerged at whatever depth therein that electric field sensing is desired. Or, in the alternative, housing 22 may be designed to have sufficient mass to cause it to sink to the bottom of an ocean, river, bay, or the like. In contradistinction to sinking, housing 22 could be so designed as to float at some predetermined location in air or space or connected to some appropriate carrier device — such as a balloon, an aircraft, or a rocket or other space craft — in the event the sensing of electric fields is desired at such locations in the atmosphere or in space. Obviously, it would be well within the purview of one skilled in the art having the benefit of the teachings presented herewith to design probe 21 and its associated apparatus so that they may be deployed as necessary to sense and measure electric fields at any place whatsoever.

The aforementioned rod assemblies and their respective connector means are substantially identical in this preferred embodiment, although the geometrical configurations and sizes thereof may be varied as will facilitate the subject probe being deployed, stored, or used for any given purpose. They can best be seen by referring to FIGS. 3 and 4, wherein they are represented in greater detail.

In order to keep this disclosure as simple as possible the view of FIG. 3 will be considered as being a housing section adjacent to that portion of hole 23 having enlargement shoulders 26 and internal threads 33, and the view of FIG. 4 will be considered as being rod assembly 41 and tip 47, although as previously suggested, all of the other functionally comparable housing sections and rod assemblies are substantially identical thereto.

Referring now to FIG. 3, there is shown housing 22, having hole 23 bored therethrough, with an enlarged diameter 81 effected at the outer end thereof, so as to form shoulder 26. A metal washer 82 having a hole 83 therethrough is disposed to seat on shoulder 26 within enlarged diameter 81. One of the electrical wire conductors 84 of any pair of the aforesaid wire conductors is threaded through hole 83 and connected to the outer surface of washer 82 by means of a solder bead 85. An externally and internally threaded metal insert 86 is screwed into enlarged diameter 81, and an electrically non-conductive washer 87 having a hole 88 therethrough is disposed against a flattened or substantially flat surface 89 of housing 22 in such manner that the center of hole 88 is in alignment with the longitudinal axes of hole 23 and the internally threaded diameter of insert 86.

FIG. 4 depicts rod assembly 41 as including a metalic rod 91 having a threaded end 92, the threads of which are compatible with the internal threads of insert, a flanged portion 93, and another threaded end 94 at the outer end thereof. A metallic tip 47 having an internally threaded bore 95 is screwed on the outer threaded end of rod 91. A slot 96 may be incorporated therein to facilitate the assembly and disassembly thereof with a screw driver, if so desired. That outer surface of rod 91 and flange 93 is coated with any suitable electrically insulating material 97, such as plastic, rubber, or the like.

As may readily be seen, the rod assembly of FIG. 4 may be connected to the housing assembly of FIG. 3 merely by screwing externally threaded end 92 of rod 91 into the internally threaded bore of insert 86, thereby effecting an electric field sensing appendage or electrode that is easily installed for operation and removed for replacement or more convenient manufacture and storage.

An electric field probe of the type illustrated in FIGS. 1 through 4 has utility in conjunction with data processing apparatus of various and sundry types, two of which are represented as being typical but yet unique species thereof in FIGS. 5 and 6.

FIG. 5 discloses electric field sensing probe 21 having a trio of outputs, each of which produces an electric signal that is proportional to one of the orthogonal components of the total electric field being detected at that particular place and time by the probe. Said trio of outputs are respectively connected to a trio of data or signal processing channels 101, 102, and 103, which are ordinarily substantially identical in structure and function.

The input of channel 101 is a variable step attenuation network 104 used for the purpose of changing the level of the signal supplied thereto to a most useful level, regardless of operating conditions. Thus, the input thereof is connected to one of the outputs of probe 21. Connected in series with step attenuation network 104 are an X-axis buffer amplifier 105 for circuit isolation purposes, a transformer 106, a full wave rectifier 107, and another buffer amplifier 108 for circuit isolation purposes.

The input of channel 102 is another variable step attenuation network 110 similar to the aforementioned variable step attenuation network 104. The input thereof is connected to another of the outputs of probe 21, and connected in series therewith is a Y-axis circuit isolation buffer amplifier 111, a transformer 112, a full wave rectifier 113, and another circuit isolation buffer amplifier 114.

The input of channel 103 is the input of another variable step attenuation network 115 of a type similar to that of network 104 and 110.

At this time, it is perhaps noteworthy that network 104, 110, and 115 are ganged together in such manner that they may be manually or otherwise adjusted to provide the attenuations needed simultaneously; however, if so desired, adjustments thereto may be made separately and individually.

The input of variable step attenuation network 115 is connected to the remaining output of probe 21, and series connected to the output thereof is a Z-circuit isolation buffer amplifier 116, a transformer 117, a full wave rectifier 118, and another circuit isolation buffer amplifier 119.

The outputs of buffer amplifiers 108, 114, and 119 are connected to the inputs of a resolver network 121, a device which produces a signal (R) having a value that is proportional to the scalar resultant of the three component inputs thereto. The output of resolver network 121 is connected to the input of a driver amplifier 122.

In this particular embodiment, transformers 106, 112, and 117; full wave rectifiers 107, 113, and 118; buffer amplifiers 108, 114, and 119; resolver network 121; and driver amplifier 122 are considered to constitute a magnitude computer 123 which, in effect, produces the aforesaid resultant signal (R).

The output of driver amplifier 122, of course, constitutes the output of magnitude computer 123 and is connected to an adjustable gain readout 124, calibrated in any desired, useful readout terms.

Referring now to FIG. 6, there is shown probe 21, again having a trio of outputs, each of which constitutes an orthogonal component output of a sensed total electric field.

Connected to one of the outputs of probe 21 is an adjustable step attenuation network 131, and connected to the output thereof is an X-buffer amplifier 132. Connected to another of the outputs of probe 21 is an adjustable step attenuation network 133, and connected to the output thereof is a Y-buffer amplifier 134. Connected to the remaining output of probe 21 is an adjustable step attenuation network 135, and connected to the output thereof is a Z-axis buffer amplifier 136.

The outputs from X-, Y-, and Z-buffer amplifiers 132, 134, and 136 are connected to the component data inputs of a magnitude computer 137 that is substantially identical to the aforesaid magnitude computer 123 of the system of FIG. 5 and, thus, produces a signal (R) that equals the magnitude of the resultant of the electric field being measured. The output thereof is connected through a circuit isolation buffer amplifier 138 to one of the inputs of a trio of divider circuits 141, 142, and 143, which respectively divide the input X, Y, and Z electric field components by the resultant field magnitude R to produce output signals respectively proportional thereto.

The outputs of dividers 141, 142, and 143 are connected to the inputs of a resolver computer 144 which computes the vector resultant thereof and produces an output signal proportional thereto. The outputs of each of the aforesaid buffer amplifier 13, dividers 141, 142, and 143, and resolver computer 144 are connected to the inputs of an angular, scalar, and vector quantities readout 145, which is preferably of the type that may selectively be adjusted to indicate any or all thereof at any given time. Of course, to effect such indications, readout 145 should be calibrated in terms thereof.

At this time, it would perhaps be noteworthy that all of the individual components of the systems of FIGS. 5 and 6, with the exception of probe 21, are conventional and well known per se. It is, therefore, to be understood that it is their respective unique interconnections and interactions which make up the new and unique combinations of this invention and caused the new and useful results to be produced thereby.

THEORY OF OPERATION

Because the theory of operation is, indeed, simple, it will only be discussed briefly at this time.

Referring now to FIG. 7, there is shown a graphical representation of the X-, Y-, and Z-components of an electric field — such as, for example, the earth's electrical field — which may be sensed if the aforementioned probe 21 is physically disposed at location 0, with the three pairs of diametrically opposed rods thereof extended along the X, Y, and Z axes, respectively. Then the component strengths respectively sensed thereby are converted to a trio of electrical analog signals that are proportional thereto. By employing analog equivalents of the trigonometric functions involved, the aforesaid electrical signals are processed and resolved into their resultant having a magnitude R, which, of course, may be readout in any desired scalar terms or units. The system of FIG. 5 effects such sensing, analog data processing, and readout. Furthermore, by employing additional mathematical calculations — that is, by dividing each of said X-, Y-, and Z-components by R — the angular aspects — $\alpha$, $\beta$, and $\Gamma$ — of said resultant R may be obtained which, in turn, may be read out independently or further resolved in such manner that the resultant vector quantity $\bar{R}$ may be indicated. Of course, the system of FIG. 6 effects such sensing, analog data processing, and readout. Obviously, the readouts may be calibrated to indicate any appropriate, desired parameters.

From the foregoing, it may readily be seen that the practice of the disclosed embodiments of the invention is, indeed, expedited as a result of the simple theory incorporated. Yet, in spite of its simplicity, ostensively new and exceptionally useful results are obtained therefrom, viz., the sensing and measuring of the orthogonal components of a total electric field, as well as the total electric field per se.

MODE OF OPERATION

The useful modes of operation of the instant invention are many — so many, in fact, that it would probably require a treatise to describe them all. However, as evidence of the usefulness thereof, some of the possible modes of operation have been schematically depicted in FIGS. 8 through 14, respectively. Because all of the electric field probes employed therein are similar to probe 21 of FIG. 1, they will likewise be referenced by numeral 21.

For example, in FIG. 8 there is shown a representative buoy 150, from which is suspended, either by a flexible cable or fixed rod 151, a probe 21. Of course, in this type of operation, buoy 150 floats on the surface of the water, and it preferably contains the receiver or data processing portion or portions of the invention. In addition, it may contain a transmitting means that would act as the transmitting telemetering link to some remotely disposed receiving telemetering link. Buoy 150 may, of course, be either free-floating or substantially positioned in water 152 by suitable cables and anchors (not shown). Obviously, in this particular application, the invention is being used to sense and measure the electric field in water. However, a similar electric field sensing probe could also be mounted on top of buoy 150 in such manner as would cause it to sense the electric field in the atmosphere, without violating the spirit and scope of the invention.

FIG. 9 discloses a surface ship 154, which has a fixed probe 21 suspended therefrom by a pipe 155 and a trailing probe 21 towed by a cable 156. Of course, both pipe 155 and cable 156 contain the appropriate electrical conductors to electrically connect probes 21 to a receiver 157, which may include the types of data processors illustrated in FIGS. 6 and 7. In this application of the invention probes 21 are disposed in water 158, such as sea water, or the like; moreover, as a result of sensing an anomaly in the earth's electric field therein, an object 159 laying on or submerged in the sea floor 160 may be found.

FIG. 10 shows an underwater vehicle 161 towing probe 21 through water 162 by means of tow cable 163 for the purpose of sensing an electric field therein or an anomaly thereof caused by some object 164 perhaps located therein.

FIG. 11 depicts a helicopter 165 towing or dipping probe 21 in water 166 by means of cable 167 for electric field sensing purposes.

FIG. 12 shows a pair of probes 21 respectively mounted on and connected to a receiver 168 in such manner as to measure the electric fields in air 169 and within land or earth 171. In air, for instance, an electric field anomaly may occur as a result of electrical current flowing through transmission wires, and such anomaly may be sensed and measured as an indication of said current flow.

FIG. 13 shows a simple application, whereby an aircraft 173, having probe 21 mounted thereon by means of a pipe 174, flies over land or water and senses the electric field continually as it does so. Also, it may sense electric field anomalies caused by various and sundry objects 175 and 176 buried beneath or laying on the earth's surface 177 or perhaps even suspended in the air.

FIG. 14 depicts a mobile vehicle, such as a truck 179, having a receiver 181, to which is connected probe 21 by means of fixed pipe 182. In this particular representative application of the invention, it is being used to sense electric fields at, near, or within range of places where an explosion 183 has occurred which, itself, creates an electric field or disturbs the earth's electric field.

From the foregoing, it may readily be seen that the subject invention has numerous applications and, thus, performs numerous functions which, in and of themselves, are either unique or constitute vast improvements over those obtainable from the various and sundry devices of the prior art.

Obviously, other embodiments and modifications of the subject invention will readily come to the mind of one skilled in the art having the benefit of the teachings presented in the foregoing description and the drawings. It is, therefore, to be understood that this invention is not to be limited thereto and that said modifications and embodiments are intended to be included within the scope of the appended claims.

What is claimed is:

1. An instrument for sensing an electric field within a predetermined environmental medium, comprising in combination:
    an electrically nonconductive housing;
    a trio of passageways disposed in said housing in such manner that they meet at substantially a common junction and extend along orthogonal axes thereof;
    a sextet of metallic rods respectively mounted on said housing in such manner as to have the inner ends thereof in communication with the outer extremities of said trio of passageways and with the longitudinal axes thereof located so as to be extensions of the aforesaid orthogonal axes;
    a sextet of metallic tips connected to the outer ends of said sextet of metallic rods, respectively;
    means coating the outside of each of said sextet of rods for effecting the electrical insulation of the outside surface thereof between the respective tips thereof, said housing, and said predetermined environmental medium;
    another passageway located in said housing in such manner as to be in communication with the aforesaid trio of passageways;
    a trio of pairs of electrical conductors, effectively and respectively connected to the diametrically opposed inner ends of said sextet of metallic rods and extending out of said another passageway, adapted for being connected to a utilization apparatus at the other ends thereof; and
    means connected to said housing at said another passageway and disposed around said sextet of electrical conductors for the electrical insulation thereof from the aforesaid predetermined ambient environmental medium.

2. The device of claim 1, wherein said sextet of metallic rods respectively mounted on said housing in such manner as to have the inner ends thereof in communication with the outer extremities of said trio of passageways and with the longitudinal axes thereof located so as to be extensions of the aforesaid orthogonal axes each comprise:
    a metallic shaft;
    external threads located at the inner end of said shaft;
    a flange attached to said shaft in contiguous disposition with the outer end of the external threads located at the inner end thereof; and
    external threads located at the outer threads of said shaft.

3. The device of claim 1 wherein said sextet of metallic tips each have:
    an internally threaded hole extending a partial distance therethrough; and
    a slot cut in the outer end thereof.

4. The device of claim 1, wherein said means connected to said housing at said another passageway and disposed around said sextet of electrical conductors for the electrical insulation thereof from the aforesaid predetermined ambient environmental medium comprises a rigid hollow elongated pipe for supporting the aforesaid electric field sensing instrument.

5. The device of claim 1, wherein said means connected to said housing at said another passageway and disposed around said sextet of electrical conductors for the electrical insulation thereof from the aforesaid predetermined ambient environmental medium comprises a flexible insulated cable for towing the aforesaid electric field sensing instrument.

6. The invention of claim 1 further characterized by:
    a sextet of enlarged, internally threaded sections located at the outer extremities of said trio of passageways in such manner as to effect a like sextet of outwardly facing shoulders at the inner ends thereof, respectively;
    a sextet of metallic washers, having holes through the centers thereof, disposed within the sextet of enlarged, internally threaded sections located at the outer extremities of said trio of passageways in such manner as to have the inner faces thereof abut the aforesaid outwardly facing shoulders, respectively;
    a metallic insert, having an internally threaded aperture therethrough and external threads that are compatible with the internal threads of the aforesaid enlarged internally threaded sections located at the outer extremities of said trio of passageways, disposed within said enlarged internally threaded sections in such manner as to be secured therein; and
    an electrically nonconductive washer, having a center hole that is greater in diameter than the internally threaded aperture of said metallic insert, abutting the outer surface of the aforesaid electrically non-conductive housing in such manner that the center hole thereof is in alignment with the longitudinal axis of said internally threaded aperture.

7. The invention of claim 1 further characterized by a sextet of flat surfaces cut into said electrically non-conductive housing in such manner as to exist around the ends of said trio of passageways and be substantially normal to the longitudinal axes thereof, respectively.

8. The device of claim 1 wherein said utilization apparatus to which the other ends of said trio of pairs of electrical conductors are adapted for connection comprises:
    means connected to said trio of pairs of electrical conductors for the processing of the trio of output signals therefrom in such manner that they will have optimum useful strength levels, respectively;
    circuit isolation means connected to the outputs of aforesaid output signals processing means for the buffer amplification of each of said trio of signals;
    a computer connected to the outputs of said circuit isolation means for computation of the magnitude of the resultant of the processed and buffer amplified trio of signals and for producing an output signal proportional thereto; and
    a readout connected to the output of said computer.

9. The invention of claim 8 further characterized by:

means effectively connected to said computer and to said circuit isolation means for dividing one of said trio of signals by the resultant thereof and for producing a first output signal proportional thereto;

means effectively connected to said computer and to said circuit isolation means for dividing another of said trio of signals by the resultant thereof and for producing a second output signal proportional thereto;

means effectively connected to said computer and to said circuit isolation means for dividing the remainder of said trio of signals by the resultant thereof and for producing a third output signal proportional thereto;

a resolver computer having a trio of inputs and an output, with the trio of inputs thereof respectively connected to the outputs of said first, second, and third signal producing dividing means, and with the output thereof connected to the aforesaid readout.

10. The invention of claim 9 further characterized by a buffer amplifier connected between the output of said first mentioned computer and inputs of the aforesaid first, second, and third signal producing dividing means.

* * * * *